3,385,809
FAT ACID AMIDES OF N,N-DIALKYL(ALKYLENE DIAMINES) AS CURING AGENTS FOR EPOXY RESINS
Bernard M. Wiltgen, Jr., Villa Park, Ralph P. Arthur, Addison, and Samuel Shore, Roselle, Ill., assignors to The Richardson Company, Melrose Park, Ill., a corporation of Ohio
No Drawing. Filed Sept. 3, 1965, Ser. No. 485,074
6 Claims. (Cl. 260—18)

ABSTRACT OF THE DISCLOSURE

Process of producing cured epoxy resins using fatty amido amines to provide products with toughness and flexibility. Illustrative of the fatty amido amines is dimethyl amino propyl stearylamide.

This invention relates to epoxy resins, more particularly to the preparation of cured epoxy resins which are characterized by toughness and flexibility.

Toughness and flexibility are two properties of considerable importance in the use of epoxy resins for such purposes as molding compounds, potting and incapsulating compounds, adhesives, coatings, films and the like. These properties result from the treatment of the uncured epoxy resin with a curing agent to produce the hard, infusible end product with the desired combination of properties.

In the past, the particular combination of toughness and flexibility of these end products in addition to their other properties has not always been satisfactory. In addition, the curing process to produce the tough, flexible end products has usually involved various polyamides as curing agents. In many instances, these conventional flexibilizing curing agents have been found to have significant molecular weights necessitating the use of appreciable amounts of the curing agents and have been somewhat costly.

Therefore, one object of this invention is the preparation of cured epoxy resins which are characterized by toughness and flexibility. Another object is the preparation of these resins with other curing agents which are not polymeric and in addition are useful in small amounts and are low cost. Other objects of the invention will become apparent from the detailed description below.

We have discovered that the treatment of uncured epoxy resins with fatty amido amines produces cured end products which exhibit excellent toughness and flexibility. The fatty amido amine not only generally produces end products with improved toughness and flexibility, but also exhibits an unusual combination of properties through its amido and amino groups in addition to its long hydrocarbon chain. Its low cost provides further advantages to its usefulness. The amine so useful as the curing agent is characterized by the following formula:

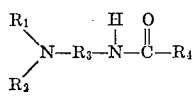

wherein $R_1$ and $R_2$ are saturated alkyl groups having from 1–4 carbon atoms, $R_3$ is a saturated alkyl group having from 1–6 carbon atoms and $R_4$ is an aliphatic group having from 5–35 carbon atoms.

Exemplary $R_1$ and $R_2$ groups are methyl, ethyl, propyl and butyl radicals whereas the $R_3$ group includes the foregoing radicals as well as the pentyl and hexyl radicals. The $R_4$ group may be either saturated or unsaturated (olefinic unsaturation), and has advantageously from about 11 to about 17 carbon atoms and not more than about 3 unsaturated groups. Advantageously, the acids used to provide the $R_4$ group are the fatty acids such as stearic, linoleic, oleic, and lauric.

Due to the convenience in manufacture, cost and advantageous results, the preferred specie of fatty amido amine is that wherein $R_1$ and $R_2$ are methyl, $R_3$ is propyl and $R_4$ is stearyl, linoleyl, oleyl, or lauryl. It is understood that $R_4$ includes mixtures of these groups as well as individual groups.

The process for preparing the cured epoxy resins characterized by toughness and flexibility, comprises heating at an elevated temperature the uncured epoxy resin with at least about 2.5 percent by weight of the defined fatty amido amine, under curing conditions to convert the uncured resin to the cured resin. Advantageously, the curing agent is present in an amount of at least 2.5 percent by weight in order to effectively produce the desired cure and necessary resistance to heat distortion. Depending upon the particular epoxy resin and the number of epoxy groups in the resin, increased amounts of curing agent normally produces improved properties up to an optimum value. Based on an epoxy resin characterized as a diglycidyl ether of bisphenol A, the optimum value of the curing agent is about 5 perecnt by weight. In general, the preferred amount of the curing agent is in the range of from about 2.5 to about 20 percent by weight based on the weight of uncured resin plus amine curing agent.

Although it is not known for certain, it is believed that the curing of the epoxy resin is probably accomplished through the catalytic action of the tertiary amine portion of the curing agent. It is also believed that the fatty acid portion of the amide aids in providing the desirable combination of toughness and flexibility in the cured epoxy resin.

As stated above, the curing agents of this invention are useful with a wide variety of epoxy resins which may also be characterized as polyepoxide resins or resin-forming systems. Polyepoxides are characterized by the presence of a plurality of epoxy groups

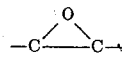

sometimes referred to as "oxirane groups." Polyepoxides may be aliphatic, aromatic, cycloaliphatic or heterocyclic and may contain substituents, such as hydroxyl groups or halogen atoms, etc. Many epoxies currently in use are polyglycidal ethers obtained by the reaction of epichlorohydrin with a polyhydric compound in the presence of an alkaline medium. These polyhydric compounds may be polyhydric alcohols or polyhydric phenols. Polyhydric alcohols, which may be reacted with epichlorohydrin, for example, to produce polyglycidyl ethers are exemplified by glycerol, propylene glycol, butylene glycol, sorbitol, mannitol and the like. Polyhydric phenols are exemplified by phenol, resorcinol and bisphenols, such as 2,2-bis (4 - hydroxyphenol)propane. Additionally, expoxylated novolaks have gained some acceptance, these compounds being obtainable by racting epichlorohydrin in an alkaline medium with fusible phenol-formaldehyde condensation products.

Additional polyepoxides capable of being cured to a hard, infusible state are those obtained through the peracetic acid route and are exemplified by dicyclopentadiene diepoxide and epoxidized triglycerides, such as epoxidized soybean oil.

For further disclosure of the various types of epoxy resin or resin-forming compounds which may be used in combination with the present curing agents, reference is made to numerous examples referred to in the patents to Shokal 2,915,485 and Schroeder 2,903,381. Additionally, the publications by Skeist, "Epoxy Resins," 1958, and by Lee and Neville, "Epoxy Resins," 1959, also may be referred to for a disclosure of various epoxy resins which may be employed and processes for making the same.

The above-described curing agents are particularly useful when the uncured epoxy resin is a polyglycidyl ether of a polyhydroxyl phenol. Advantageously, the particular amine is dimethyl amino propyl amide derived from fatty acids having from about 12 to 18 carbon atoms, and the amine is present in about 4 to 10 percent by weight of the uncured resin plus amine.

The following examples are illustrative embodiments of the invention. It is understood that these embodiments are for illustrative purposes only and do not purport to be wholly definitive with respect to conditions or scope.

Example I

About 100 parts by weight of a diglycidal ether of bisphenol A (with an epoxy equivalent weight of about 187) were mixed with about 5 parts by weight of dimethyl amino propyl cocoamide. The mixture was cured for about 3 hours at 300° F. A hard, transparent and flexible resin resulted with the following properties:

Heat distortion temp. at 264 p.s.i. (ASTM
  D–648–56) _____ 169° F.
Flexural strength (ASTM D–790–63) ___ 13,900 p.s.i.
Deflection (max.) (ASTM D–790–63) _. 0.54 in.
Izod impact (ASTM D–256–56) _____. 0.78 ft.-lb./in.
  of notch.

For comparison purposes another sample of the diglycidal ether used above (about 100 parts by weight) was mixed with a polyamide curing agent derived from dimerized linoleic acid in an amount (79.5 parts by weight) conventionally used. This mixture was cured for 3 hours at 300° F. and produced a cured resin with the following properties:

Heat distortion temp. at 264 p.s.i. (ASTM
  D–648–56) _____ 150° F.
Flexural strength (ASTM D–790–63) ___ 12,800 p.s.i.
Deflection (max.) (ASTM D–790–63) _. 0.46 in.
Izod impact (ASTM D–256–56) _____. 0.47 ft.-lb./in.
  of notch.

The above results demonstrate that the curing agent of the invention is very useful in producing flexible and tough cured resins with appreciable heat distortion temperatures. The cured resin produced by the inventive curing agent, in comparison to conventional cured resin, exhibited a high degree of flexibility as indicated by the maximum deflection value of 0.54 in., with no loss in strength. Actually, an improved flexural strength was obtained. In addition, the inventive resin exhibited a surprisingly high degree of toughness as indicated by the impact rating of 0.78 ft.-lb./in. of notch, when compared to the lower value of 0.47 ft.-lb./in. of notch from the conventional resin. The heat distortion temperature of 169° F. further indicates the beneficial combination of properties provided by the inventive resin.

Example II

Mixtures of the uncured epoxy resin and inventive curing agent described in Example I at three concentrations were tested to indicate the effectiveness of the curing agent. The data are presented below.

| Parts by weight: | | | |
|---|---|---|---|
| Uncured epoxy resin | 99 | 95 | 90 |
| Dimethyl amino propyl cocoamide | 1 | 5 | 10 |
| Cure, 2 hours at 300° F.: | | | |
| HDT, ° F. at 264 p.s.i. | (¹) | 167 | 140 |
| Barcol Hardness | (¹) | 72 | 72 |

¹ No cure.

The above results demonstrate that more than about 1 percent by weight of the curing agent was necessary to cure the epoxy resins; that about 5 percent produced an optimum cure, and that 10 percent produced a satisfactory cure, although less than optimum.

In addition, epoxy resins produced from the inventive curing agent have been tested for their electrical insulation properties with very acceptable results.

While the invention has been described in conjunction with specific examples thereof, these are illustrative only. Accordingly, many alternatives, modifications, and variations will be apparent to those skilled in the art in the light of the foregoing description, and it is therefore intended to embrace all such alternatives, modifications, and variations as to fall within the spirit and broad scope of the appended claims.

We claim:
1. A process for preparing cured epoxy resins characterized by toughness and flexibility, which process comprises heating an uncured epoxy resin having a plurality of epoxy groups, with at least 2.5 percent by weight of a fatty amido amine having the following formula:

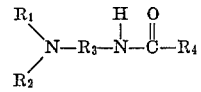

wherein $R_1$ and $R_2$ are saturated alkyl groups having from 1–4 carbon atoms, $R_3$ is a saturated alkyl group having from 1–6 carbon atoms and $R_4$ is an aliphatic hydrocarbon group having from 5–35 carbon atoms, said heating being carried out under curing conditions to convert said uncured resin to said cured resin.

2. The process of claim 1 wherein said amine is present in from about 2.5 to about 20 percent by weight based on said uncured resin plus amine.

3. The process of claim 2 wherein said uncured epoxy resin is a polyglycidyl ether of a polyhydroxyl phenol, said amine is dimethyl amino propyl amide derived from fatty acids having from about 12 to about 18 carbon atoms, and said amine is present in from about 4 to about 10 percent by weight of said uncured resin plus amine.

4. The process of claim 3 wherein said fatty acid is saturated and has about 12 carbons, and said amine is present in about 5 weight percent.

5. A tough, flexible epoxy resin produced by the process of claim 1.

6. The epoxy resin of claim 5 wherein said uncured epoxy resin is a polyglycidyl ether of a polyhydroxyl phenol, said amine is dimethyl amino propyl amide derived from fatty acids having from about 12 to about 18 carbon atoms, and said amine is present in from about 4 to about 10 percent by weight of said uncured resin plus amine.

References Cited

FOREIGN PATENTS 897,726   5/1962   Great Britain.

DONALD E. CZAJA, *Primary Examiner.*

J. A. SEIDLECK, *Examiner.*

C. W. IVY, *Assistant Examiner.*